(12) United States Patent
Yoshitomi et al.

(10) Patent No.: US 12,527,505 B2
(45) Date of Patent: Jan. 20, 2026

(54) BIOELECTRODE AND METHOD FOR PRODUCING BIOELECTRODE

(71) Applicant: NOK CORPORATION, Tokyo (JP)

(72) Inventors: Takumi Yoshitomi, Fujisawa (JP); Ryo Futashima, Fujisawa (JP); Toru Uda, Fujisawa (JP)

(73) Assignee: NOK CORPORATION (JP)

( * ) Notice: Subject to any disclaimer, the term of this patent is extended or adjusted under 35 U.S.C. 154(b) by 1135 days.

(21) Appl. No.: 16/977,013

(22) PCT Filed: Oct. 16, 2019

(86) PCT No.: PCT/JP2019/040641
§ 371 (c)(1),
(2) Date: Aug. 31, 2020

(87) PCT Pub. No.: WO2020/080396
PCT Pub. Date: Apr. 23, 2020

(65) Prior Publication Data
US 2021/0000371 A1   Jan. 7, 2021

(30) Foreign Application Priority Data
Oct. 17, 2018 (JP) .................................. 2018-195920

(51) Int. Cl.
*A61B 5/282* (2021.01)
*A61B 5/00* (2006.01)
(Continued)

(52) U.S. Cl.
CPC .............. *A61B 5/268* (2021.01); *A61B 5/291* (2021.01); *A61B 5/6814* (2013.01); *C08K 3/08* (2013.01);
(Continued)

(58) Field of Classification Search
CPC ....... A61B 5/268; A61B 5/291; A61B 5/6814; A61B 5/0006; A61B 5/0082;
(Continued)

(56) References Cited

U.S. PATENT DOCUMENTS 4,013,610 A * 3/1977 Tomohiro ................ C08K 9/06
523/217
5,268,404 A * 12/1993 Mowrey ................ C09J 123/28
524/433
(Continued)

FOREIGN PATENT DOCUMENTS

CA   1275520 C * 10/1990 ............ C08F 255/00
CA   2907018 A1 * 9/2014 ............ C08F 220/14
(Continued)

OTHER PUBLICATIONS

Teng, Y.-D & Zhang, B.-Y & Qu, X.-Y & Mu, J.-R. (2008). Effect of isocyanate on adhesion of EPDM rubber to metal. Cailiao Kexue yu Gongyi/Material Science and Technology. 16. 423-426. (Year: 2008).*
(Continued)

*Primary Examiner* — Ronald Hupczey, Jr.
*Assistant Examiner* — Ana Veruska Guerrero
(74) *Attorney, Agent, or Firm* — Harness, Dickey & Pierce, P.L.C.

(57) ABSTRACT

A bioelectrode and a method for producing the bioelectrode are provided. The bioelectrode has a non-complicated structure, satisfactory elasticity, and is capable of preventing an increase of contact impedance due to an increase of the number of times of usage. The bioelectrode includes a support member, which is an electrically conductive member, and at least one electrode member, which is a member projecting from the support member. At least the electrode member is molded from an electrically conductive rubber
(Continued)

containing a silicone rubber and treated metal particles containing a crosslinkable functional group on a surface thereof.

6 Claims, 9 Drawing Sheets

(51) Int. Cl.
| | |
|---|---|
| *A61B 5/24* | (2021.01) |
| *A61B 5/268* | (2021.01) |
| *A61B 5/291* | (2021.01) |
| *C08K 3/08* | (2006.01) |
| *C08K 9/04* | (2006.01) |
| *C08L 19/00* | (2006.01) |
| A61B 5/024 | (2006.01) |
| A61B 5/256 | (2021.01) |
| A61B 5/263 | (2021.01) |
| A61B 5/273 | (2021.01) |
| A61B 5/279 | (2021.01) |
| A61B 5/31 | (2021.01) |
| A61B 5/316 | (2021.01) |
| A61B 5/333 | (2021.01) |
| A61B 5/372 | (2021.01) |
| A61B 5/375 | (2021.01) |
| C08K 3/02 | (2006.01) |
| C08K 3/34 | (2006.01) |

(52) U.S. Cl.
CPC ............... *C08K 9/04* (2013.01); *C08L 19/00* (2013.01); *A61B 5/0006* (2013.01); *A61B 5/0082* (2013.01); *A61B 5/02427* (2013.01); *A61B 5/02438* (2013.01); *A61B 5/24* (2021.01); *A61B 5/256* (2021.01); *A61B 5/263* (2021.01); *A61B 5/273* (2021.01); *A61B 5/279* (2021.01); *A61B 5/282* (2021.01); *A61B 5/31* (2021.01); *A61B 5/316* (2021.01); *A61B 5/333* (2021.01); *A61B 5/372* (2021.01); *A61B 5/375* (2021.01); *A61B 2562/02* (2013.01); *A61B 2562/0215* (2017.08); *C08K 2003/023* (2013.01); *C08K 2003/0806* (2013.01); *C08K 3/34* (2013.01); *C08L 19/006* (2013.01); *C08L 2312/00* (2013.01); *C08L 2312/08* (2013.01)

(58) Field of Classification Search
CPC ... A61B 5/02427; A61B 5/02438; A61B 5/24; A61B 5/256; A61B 5/263; A61B 5/273; A61B 5/279; A61B 5/282; A61B 5/31; A61B 5/316; A61B 5/333; A61B 5/372; A61B 5/375; A61B 2562/02; A61B 2562/0215; A61B 5/265; A61B 5/6843; A61B 5/6803; A61B 2562/125; C08K 3/08; C08K 9/04; C08K 3/34; C08K 2003/023; C08K 2003/0806; C08K 9/06; C08L 19/00; C08L 19/006; C08L 2312/00; C08L 2312/08
See application file for complete search history.

(56) References Cited

U.S. PATENT DOCUMENTS

| | | | | |
|---|---|---|---|---|
| 2001/0051667 | A1* | 12/2001 | Hayashida | C08K 3/22 524/588 |
| 2006/0047043 | A1 | 3/2006 | Nakayoshi et al. | |
| 2016/0143554 | A1* | 5/2016 | Lim | A61B 5/6803 600/386 |
| 2018/0125386 | A1* | 5/2018 | Lim | A61B 5/291 |

FOREIGN PATENT DOCUMENTS

| | | | | |
|---|---|---|---|---|
| CN | 107374622 | A | 11/2017 | |
| CN | 107374622 | B * | 8/2020 | ........... A61B 5/0478 |
| EP | 1295905 | A1 * | 3/2003 | ............... C08K 3/08 |
| EP | 3220815 | A1 | 9/2017 | |
| JP | H07109501 | A | 4/1995 | |
| JP | 2002363411 | A * | 12/2002 | |
| JP | 2003-225217 | A | 8/2003 | |
| JP | 2011120866 | A | 6/2011 | |
| JP | 2013111361 | A | 6/2013 | |
| JP | 2013144051 | A | 7/2013 | |
| JP | 2013248306 | A | 12/2013 | |
| JP | 3209880 | U | 4/2017 | |
| WO | WO-2007142579 | A1 * | 12/2007 | ............. A61L 15/18 |
| WO | WO-2013080992 | A1 * | 6/2013 | ........... A61B 5/0478 |
| WO | WO-2016189422 | A1 * | 12/2016 | ........... A61B 5/0533 |
| WO | 2018-070433 | A1 | 4/2018 | |

OTHER PUBLICATIONS

D.I. Tee, M. Mariatti, A. Azizan, C.H. See, K.F. Chong, Effect of silane-based coupling agent on the properties of silver nanoparticles filled epoxy composites, Composites Science and Technology, vol. 67, Issues 11-12, 2007, pp. 2584-2591, ISSN 0266-3538. (Year: 2007).*
European Search Report issued in the corresponding European Patent Application No. 19872922.0; dated Jul. 15, 2022 (total 10 pages).
D.I.Tee et al., "Effect of silanebasedvcoupling agent on the properties of silver nanoparticles filled epoxy composites"; Composites Science and Technology; vol. 67, No. 11-12, published May 17, 2007; pp. 2584-2591 (total 8 pages).
Office Action for corresponding European Patent Application No. 19872922.0 dated Aug. 26, 2024 (8 Pages).
International Search Report of the International Serching Authority (in English aand Japanese) issued in PCT/JP2019/040641, mailed Dec. 24, 2019; ISA/JP.
Second Office Action issued in corresponding Chinese Patent Application No. 201980006936.6 dated Apr. 3, 2023, with English translation (16 Pages).
W. Senji et al, "Organic Silicon and the Applications", Scientific and Technical Documentation Press, May 31, 1990, with English translation (6 Pages).
S. Luhou, "New Materials and Technologies for Fine Chemicals", China Petrochemical Press, Apr. 30, 1998, with English translation (8 Pages).
X. Rujun et al., "Surface Modification and Physical Properties of Inorganic Nanomaterials", HEFEI University of Technology Publishing House, Oct. 31, 2009, with English translation (5 Pages).
English translation of Written Opinion of the International Search Authority and International Preliminary Report on Patentability Chapter I for corresponding international application No. PCT/JP2019/040641 dated Apr. 14, 2021 (7 Pages).
First Office Action for corresponding Chinese Patent Application No. 201980006936.6 dated Oct. 10, 2022, with English translation (17 Pages).
Notice of Reasons for Refusal for corresponding Japanese Application No. 2020-509560 dated Jan. 17, 2023, with English translation (6 Pages).
Decision of Refusal issued in corresponding Chinese Patent Application No. 201980006936.6 dated Jun. 16, 2023, with English translation (15 Pages).

* cited by examiner

BIOELECTRODE AND METHOD FOR PRODUCING BIOELECTRODE

CROSS REFERENCE TO RELATED APPLICATIONS

This application is a 371 U.S. National Phase of International Application No. PCT/JP2019/040641 filed on Oct. 16, 2019, which claims priority to Japanese Patent Application No. 2018-195920, filed on Oct. 17, 2018. The entire disclosures of the above applications are incorporated herein by reference.

BACKGROUND

Technical Field

The present disclosure relates to a bioelectrode and a method for producing a bioelectrode, and for example, relates to a bioelectrode containing electrically conductive particles and a method for producing the bioelectrode.

Related Art

A bioelectrode has been conventionally used for detecting a biosignal. A bioelectrode is used while being placed in contact with the body of a subject. A bioelectrode is used, for example, in order to detect a brainwave signal for analysis of a brain function state for purposes of early detection of Alzheimer's disease and the like. A bioelectrode for brainwave detection is used with an electrode member directly placed in contact with the scalp of a subject in order to detect a brainwave signal.

Conventional bioelectrodes include one in the form of a plate-like thin sheet made of a highly electrically conductive metal such as silver or gold. Such a thin sheet bioelectrode has insufficient adhesion with skin, and in order to lower contact impedance between the electrode and skin, it has been necessary to apply a gel, a cream, a paste, or the like between the skin and the bioelectrode. The applied substance has to be removed after detection of a biosignal, and use thereof has required an effort. Additionally, an electric double layer is formed by ionization of the metal on the interface between the skin and the electrode to thereby generate a polarization voltage. The variation in this polarization voltage causes a baseline variation of signal, and in order to stabilize the polarization voltage, there has been required aging for forming a silver chloride film on an electrode surface in a silver electrode.

In contrast, as bioelectrodes requiring no application of a gel or the like, there are a bioelectrode including a metal probe (see, for example, Japanese Patent Application Publication No. 2013-248306) and a bioelectrode formed by impregnating a water-absorbent member such as a sponge with an electrolyte solution in which an amino acid or organic salt is dissolved (see, for example, Japanese Patent Application Publication No. 2013-144051).

Metal probes, which are rigid, may cause pain to a subject when allowed to adhere to the scalp in some cases, and in a case where a plurality of metal probes are provided, a measure is required to make adhesion of all the probes to the scalp satisfactory. For this reason, as in Japanese Patent Application Publication No. 2013-248306, it is necessary to provide the metal probe with a buffering member such as a spring, and thus, the structure of the probe is complicated. Alternatively, in the case of a bioelectrode in which an electrolyte solution is used in a water-absorbent member as in Japanese Patent Application Publication No. 2013-144051, the performance is degraded due to drying, wetness leads to discomfort, and so on. Furthermore, it is difficult to form a tip end of such an electrode into a pointed shape, and it is not possible to achieve satisfactory elasticity because the electrode is excessively soft. For this reason, it is necessary to reinforce the electrode with another member in order to allow the electrode to adhere to a living body.

As mentioned above, a configuration in which the structure is not complicated, satisfactory elasticity is provided so as not to cause discomfort to a subject, and increase of contact impedance due to increase of the number of times of usage can be prevented has been required of conventional bioelectrodes.

The present disclosure is, however, devised in consideration of the above-described problems, and provides a bioelectrode having a structure not complicated, having a satisfactory elasticity, and capable of preventing increase of contact impedance due to increase of the number of times of usage, and a method for producing the bioelectrode.

SUMMARY

A bioelectrode according to the present disclosure includes: a support member, which is an electrically conductive member, and at least one electrode member, which is a member projecting from the support member, and is characterized in that at least the electrode member is molded from an electrically conductive rubber, the electrically conductive rubber containing a silicone rubber and metal particles containing a crosslinkable functional group on a surface thereof.

In one aspect of the bioelectrode of the present disclosure, the crosslinkable functional group is at least one group selected from the group consisting of a hydrolyzable silyl group, a silanol group, a (meth)acryloyl group, an amino group, a ureide group, an isocyanurate group, an isocyanate group, and an epoxy group.

In one aspect of the bioelectrode of the present disclosure, the metal particles are silver particles.

In one aspect of the bioelectrode of the present disclosure, the silicone rubber is a room temperature-curable liquid silicone rubber.

In one aspect of the bioelectrode of the present disclosure, the electrode member has a tip end part in a pointed shape.

In one aspect of the bioelectrode of the present disclosure, the electrode member has an inclined face, which is a face formed by removal in the tip end part inclinedly to an extending direction.

A method for producing a bioelectrode according to the present disclosure is a method for producing a bioelectrode including a support member, which is an electrically conductive member, and at least one electrode member, which is a member projecting from the support member, and the method is characterized by including surface-treating metal particles with a silane coupling agent to provide metal particles containing a crosslinkable functional group on a surface thereof, as a surface treatment step and molding the electrode member by stirring an electrically conductive rubber containing a silicone rubber and the metal particles containing a crosslinkable functional group on a surface thereof and molding the electrically conductive rubber into a shape projecting from the support member, as an electrode member molding step.

One aspect of the method for producing a bioelectrode of the present disclosure further includes forming a tip end of the electrode member molded in the electrode member molding step, into a pointed shape, as an electrode shape forming step.

Effects of Invention

According to the present disclosure, a bioelectrode having a structure not complicated, having a satisfactory elasticity, and capable of preventing increase of contact impedance due to increase of the number of times of usage, and a method for producing the bioelectrode can be realized.

DETAILED DESCRIPTION

Hereinafter, an embodiment of the present disclosure will be described with reference to the accompanying drawings.

Figure 1:
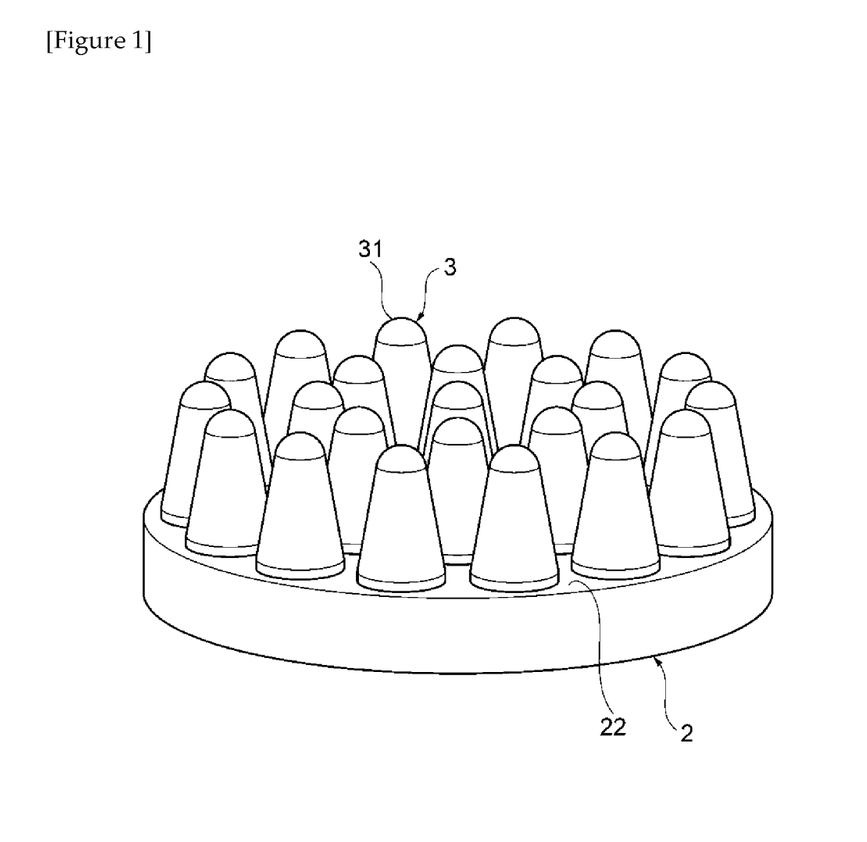
FIG. 1 is a perspective view schematically illustrating an example of a configuration of a bioelectrode according to an embodiment of the present disclosure.

FIG. 1 is a perspective view schematically illustrating a configuration of a bioelectrode 1 according to one embodiment of the present disclosure. As illustrated in FIG. 1, the bioelectrode 1 includes a support member 2, which is an electrically conductive member, and at least one electrode member 3, which is a member projecting from the support member 2. At least the electrode member 3 is molded from an electrically conductive rubber containing a silicone rubber and metal particles containing a crosslinkable functional group on the surface. In the metal particles, a crosslinkable functional group has been introduced onto the surface of the metal particles by a surface treatment using a silane coupling agent. Hereinafter, metal particles containing a crosslinkable functional group introduced onto the surface thereof by the surface treatment using a silane coupling agent are referred to also as "treated metal particles", metal particles not having been subjected to the surface treatment using the silane coupling agent and hence containing no crosslinkable functional group introduced onto the surface thereof are referred to also as "untreated metal particles", and the "treated metal particles" and the "untreated metal particles" are generically referred to also as "metal particles".

The bioelectrode 1 contacts the body of a subject in a tip end part 31 of the electrode member 3, so that a biosignal of the subject can be detected via the electrode member 3. The bioelectrode 1 is, for example, a bioelectrode for brainwave detection that contacts the head of a subject to detect a brainwave. The bioelectrode 1 is not limited to such one for brainwave detection, but is applicable to other devices for detecting a biosignal such as wearable information devices. Hereinafter, the configuration of the bioelectrode 1 will be specifically described.

The support member 2 supports the electrode member 3. Besides, the support member 2 is formed of an electrically conductive material so as to be electrically connected to the electrode member 3. In the bioelectrode 1 according to the present embodiment, the support member 2 and the electrode member 3 are integrally molded. The support member 2 may be also formed of the same electrically conductive rubber containing the treated metal particles containing a crosslinkable functional group on the surface as that used for the electrode member 3, or may be formed of an electrically conductive rubber containing the untreated metal particles containing no crosslinkable functional group on the surface. The shape of the support member 2 may be, as mentioned below, any shape capable of supporting the electrode member 3 in a state where the electrode member 3 is projecting, and is not limited to a specific shape. The support member 2 has a disk shape or a substantially disk shape, as illustrated in FIG. 1, for example.

Figure 2:
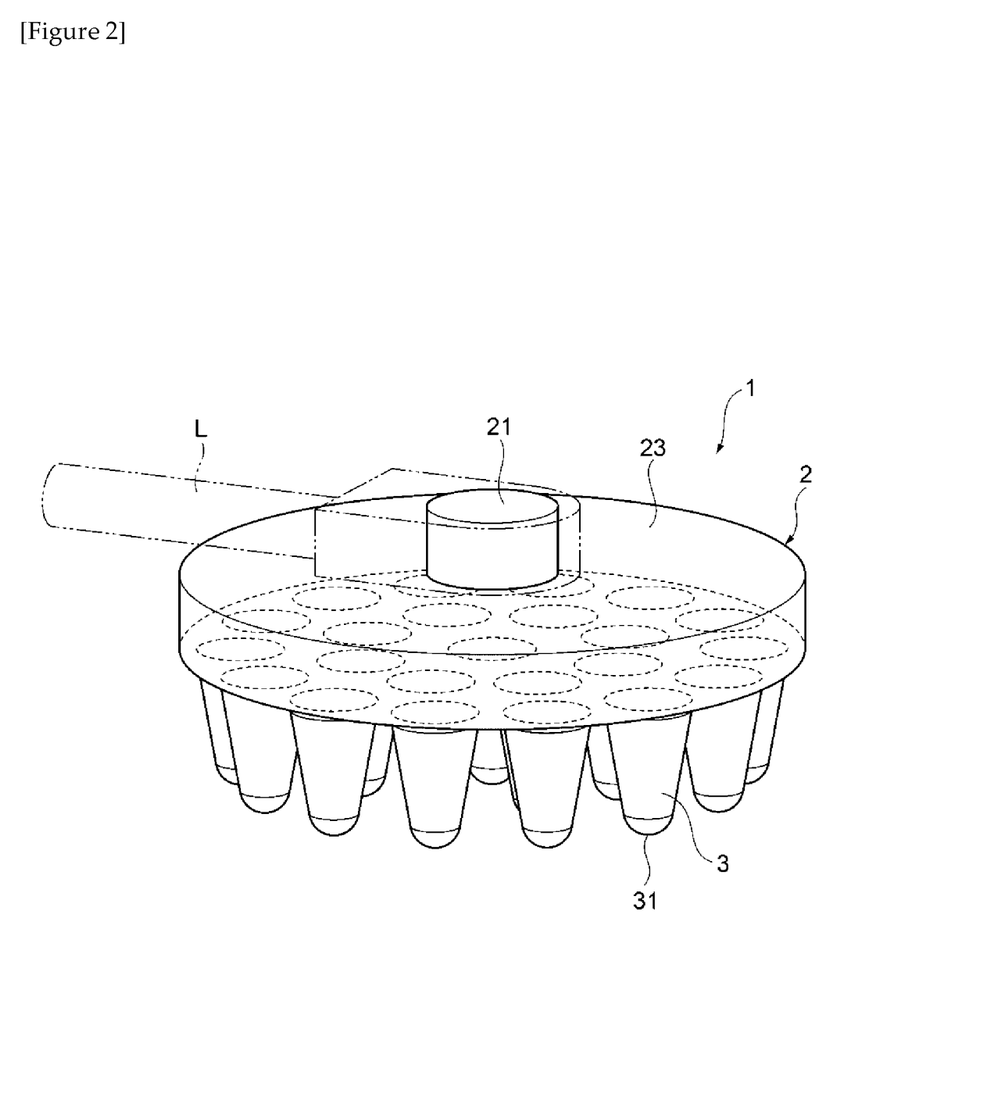
FIG. 2 is a perspective view from another direction schematically illustrating an example of the configuration of the bioelectrode illustrated in FIG. 1.

The support member 2 is provided with a terminal 21, which is to be electrically connected to a measurement apparatus, not shown, for receiving a biosignal detected by the bioelectrode 1 and processing, analyzing, displaying or the like the biosignal received. The terminal 21 is, for example, as illustrated in FIG. 2, connected to a connecting cable L that enables the measurement apparatus to be electrically connected to an external device. The terminal 21 is provided, for example, on a face (terminal side face 23) opposite to the face (support face 22) on which the electrode member 3 is supported, and has a shape enabling connection to the connecting cable L. The terminal 21 is, for example, a projecting portion that projects from the terminal side face 23. In the support member 2, the terminal 21 is integrally formed with other portions from the same electrically conductive rubber, but the terminal 21 may be one formed as a separate body from the other portions from a different material. In such a case, the terminal 21 can be formed of a material suitable for the electrical connection to the connecting cable L. For example, the terminal 21 may be produced from a metal, and may be adhesively provided on the terminal side face 23 of the support member 2 by using an electrically conductive adhesive, or may be provided by being embedded more internally than the terminal side face 23 such that a portion of the terminal 21 projects from the terminal side face 23.

The electrode member 3 is provided in a plural number in the bioelectrode 1 as illustrated in FIG. 1, projecting from the support face 22 of the support member 2 in the same or substantially the same direction. The electrode members 3 extend from the support member 2 in a manner such that the tip end parts 31 are located on the same plane, as illustrated in FIG. 1. The electrode members 3 project from the support member 2, for example, like a brush, as illustrated in FIG.

Figure 3:
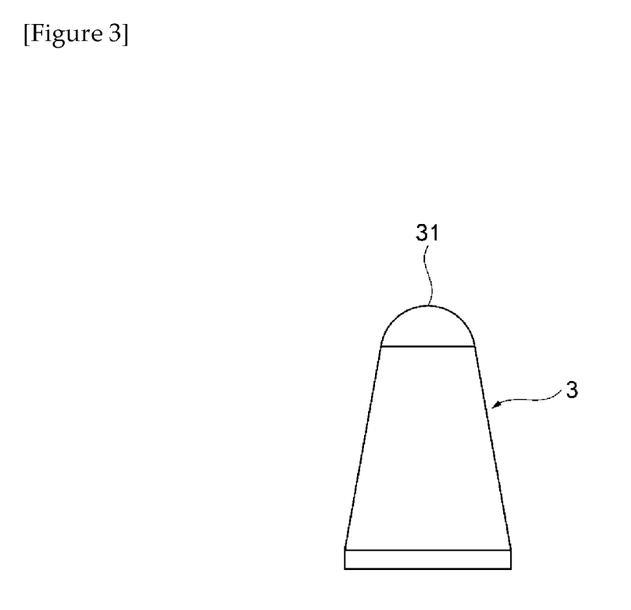
FIG. 3 is a front view of an electrode member of an example of the bioelectrode according to the embodiment of present disclosure.

1. The electrode members 3 each may extend from the support member 2 to positions adapted to a target site of a subject such that each of the tip end parts 31 contacts the target site of the subject in an equivalent state when in a usage state. In other words, the tip end parts 31 of the electrode members 3 may not be located on the same plane. The shape of each electrode member 3, as illustrated in FIGS. 1 and 3, is, for example, a cylindrical or substantially cylindrical shape, and is a shape containing a portion tapering toward the tip end part 31. The electrode member 3 may have a conical or substantially conical shape tapering toward the tip end part 31 entirely, and is required to have a shape containing the tip end part 31 and projecting from the support member 2.

The shape of the tip end part 31 is, for example, as illustrated in FIG. 3, a hemispherical or substantially hemispherical shape. Besides, the shape of the tip end part 31 may have a flat or substantially flat exposed face, which is formed by removal of a part of the hemispherical or substantially hemispherical tip end part 31 and faces orthogonally or substantially orthogonally to an extending direction of the electrode member 3. In this case, the exposed face may be a curved face or may be a face having a curved face and a flat face. The exposed face is a cut face or a polished face formed respectively by cutting or polishing the tip end part 31 of the electrode member.

Figure 4:
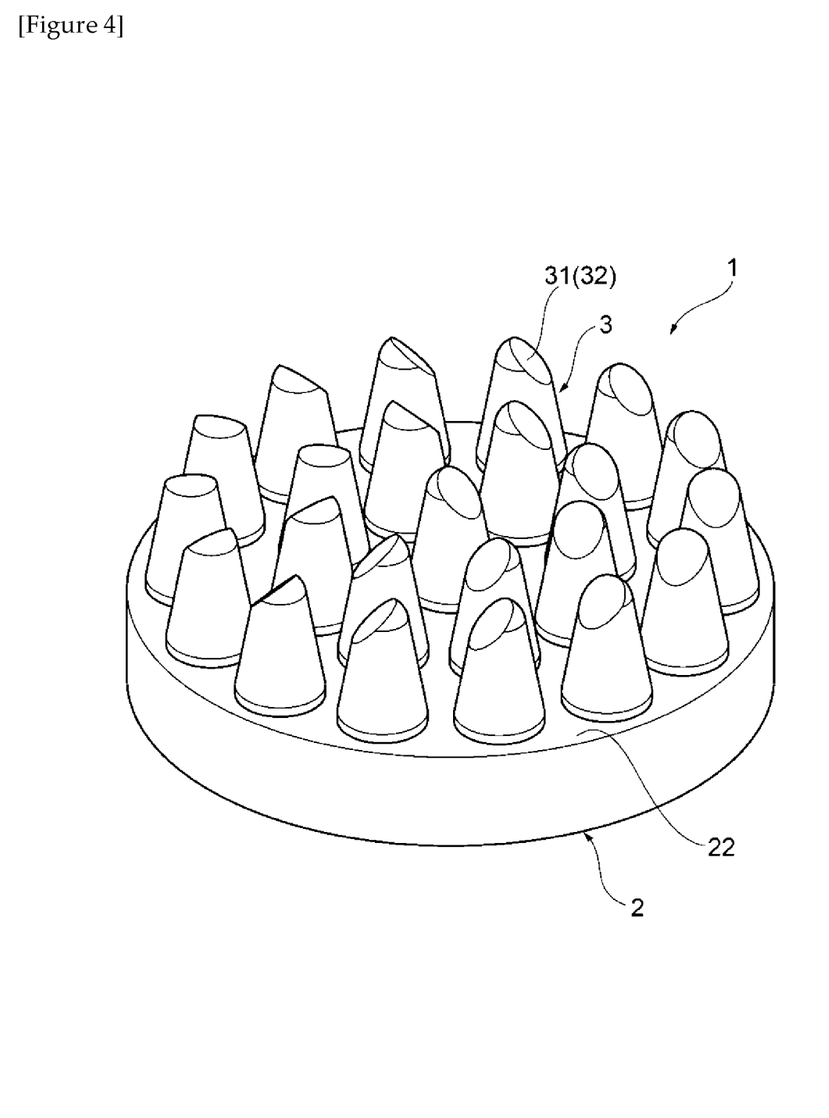
FIG. 4 is a perspective view schematically illustrating another example of the configuration of the bioelectrode according to the embodiment of the present disclosure.

FIG. 4 is a perspective view schematically illustrating another configuration of the bioelectrode 1 according to the embodiment of the present disclosure. As illustrated in FIG. 4, the shape of the tip end part 31 of the electrode member 3 may be a pointed shape in which the electrode member 3 becomes sharper from a side of the support member 21 of the tip end part 31 toward the tip end side of the electrode member 3. The pointed shape of the tip end part 31 of the electrode member 3 may be a curvilinearly or substantially curvilinearly pointed shape, or may be a linearly pointed shape. With such a pointed shape, the bioelectrode 1 can reduce contact impedance between skin and the electrode member 3 because the pointed tip end part 31 the electrode member 3 pushes hair of the subject aside to easily approach the scalp. Also, since the electrode member 3 is molded from a flexible electrically conductive rubber, even when the tip end part 31 is made to have a pointed shape and to contact the scalp, no pain occurs and discomfort minimally occurs.

Figure 5:
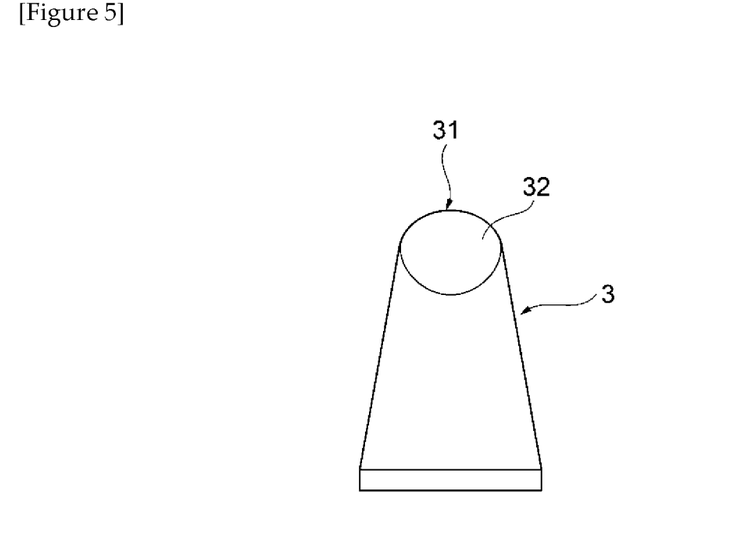
FIG. 5 is a front view of an electrode member of another example of the bioelectrode according to the embodiment of the present disclosure.
Figure 6:
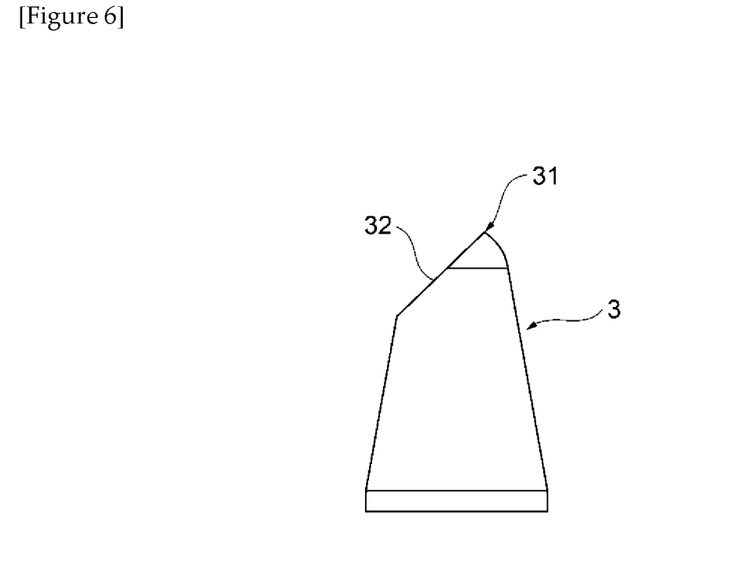
FIG. 6 is a side view of the electrode member of the other example of the bioelectrode according to the embodiment of the present disclosure.

In the present embodiment, the tip end part 31 of the electrode member 3 has, as illustrated in FIGS. 5 and 6, an inclined face 32 formed by removing a part of the tip end portion. The inclined face 32 is, for example, a face diagonally facing the extending direction of the electrode member 3, and is, for example, a flat face or a substantially flat face as illustrated in FIG. 6, and a face diagonally intersecting with the extending direction of the electrode member 3. The inclined face 32 may be a curved face or a face having a curved face and a flat face. The inclined face 32 is, as mentioned below, a face formed by removal of a tip end portion 41 from an intermediate product 40 of the electrode member 3 molded from the electrically conductive rubber (see FIG. 7), and is a cut face or a polished face formed respectively by cutting or polishing the tip end portion 41 of the intermediate product 40 of the electrode member 3.

The electrically conductive rubber forming the electrode member 3 contains, as mentioned above, the silicone rubber and the treated metal particles containing a crosslinkable functional group introduced onto the surface of the metal particles by using a silane coupling agent. As the silicone rubber, for example, an organic silicon polymer is used. As the organic silicon polymer, one containing a siloxane bond (—Si—O—) as a main chain and containing, as a side chain, a hydrocarbon group such as a methyl group, a phenyl group or a vinyl group, or hydrogen is preferable. As the silicone rubber, an addition reaction type silicone rubber may be used, or a condensation reaction type silicone rubber may be used. The addition reaction type silicone rubber is a silicone rubber cured by an addition reaction, and the condensation reaction type silicone rubber is a silicone rubber cured by a condensation reaction. One of these silicone rubbers may be singly used, or two or more of these may be used together. As the silicone rubber, for example, a room temperature-curable liquid silicone rubber is preferable. The room temperature-curable liquid silicone rubber is a silicone rubber which is in the form of a liquid or a paste before curing and turns into a rubber elastic body usually at 20° C. to 100° C. through progress of a curing reaction. The curing reaction includes one that gradually progresses by moisture (water) in air and one that readily progresses by addition of a curing agent to a main material, and the silicone rubber may be one to be cured by either type of the curing reaction. As the room temperature-curable liquid silicone rubber, only one type of room temperature-curable liquid silicone rubber may be used, or plural types of room temperature-curable liquid silicone rubbers may be mixed and used. As the room temperature-curable liquid silicone rubber, for example, a silicone rubber ("KE-106", trade name (manufactured by Shin-Etsu Chemical Co., Ltd.) and a curing agent ("CAT-RG", trade name (manufactured by Shin-Etsu Chemical Co., Ltd.) are used together.

The metal particles to be surface treated with the silane coupling agent are for example, silver particles. The metal particles may be made of any metallic material having electrical conductivity. Besides, the metal particles may contain a carbon-based material such as carbon black or a carbon nanotube.

As the silver particles used in the electrically conductive rubber, those in a form containing an aggregated silver powder and a flaky silver powder can be used. The aggregated silver powder is three-dimensional aggregation of a plurality of particulate primary particles, and the flaky silver powder is one having a scale-like shape. Average particle sizes of the aggregated silver powder and the flaky silver powder are not limited to a specific value, and for example, as the aggregated silver powder, one having an average particle size in the range of 4 μm to 8 μm is preferable, and as the flaky silver powder, one having an average particle size in the range of 5 μm to 15 μm is preferable. It is noted that an average particle size of the silver particles is an average diameter calculated based on an arithmetic mean measured in an electron micrograph.

The total amount of the aggregated silver powder and the flaky silver powder to be compounded can be appropriately set in the range where the electrical conductivity can be imparted, and is, for example, preferably in the range of 50 parts by weight to 500 parts by weight, and particularly preferably in the range of 100 parts by weight to 300 parts by weight, based on 100 parts by weight of the liquid silicone rubber. A content ratio between the aggregated silver powder and the flaky silver powder is preferably (the aggregated silver powder: the flaky silver powder=1:3 to 3:1), and it is more preferable to contain the aggregated silver powder and the flaky silver powder in the same ratio.

Examples of the flaky silver powder include "327077", trade name (manufactured by Sigma-Aldrich Co LLC), "FA-D-3", trade name (manufactured by DOWA Electronics Materials Co., Ltd.) and "FA-2-3", trade name (manufactured by DOWA Electronics Materials Co., Ltd.). Among these, as the flaky silver powder, "FA-2-3", trade name (manufactured by DOWA Electronics Materials Co., Ltd.) is preferable. As the aggregated silver particles, for example, "G-35", trade name (manufactured by DOWA Electronics Materials Co., Ltd.) is preferable.

Examples of the crosslinkable functional group to be introduced onto the surface of the metal particles include a carboxyl group, an acid anhydride group, a vinyl group, a styryl group, a hydrolyzable silyl group, a silanol group, a (meth)acryloyl group, an amino group, a ureide group, a mercapto group, an isocyanurate group, an isocyanate group, and an epoxy group. By introducing such a crosslinkable functional group onto the surface of the metal particles, a cross-linking is more suitably formed between the silicone rubber and the surface of the treated metal particles in the bioelectrode. Thus, the bioelectrode is further improved in the adhesion between the metal particles and the silicone rubber, and hence, the metal particles can be further prevented from falling off from the electrode member 3 due to the increase of the number of times of usage. From the viewpoint of further improving this effect, as the crosslinkable functional group, at least one group selected from the group consisting of a hydrolyzable silyl group, a silanol group, a (meth)acryloyl group, an amino group, a ureide group, an isocyanurate group, an isocyanate group, and an epoxy group is preferable, an isocyanate group and an epoxy group are more preferable, and an epoxy group is further preferable.

The silane coupling agent to be used in the surface treatment of the metal particles is not limited as long as the crosslinkable functional group can be introduced onto the surface of the metal particles. Examples of the silane coupling agent include a silicon compound containing a hydrolyzable silyl group such as tetramethoxysilane, tetraethoxysilane, methyltrimethoxysilane, methyltriethoxysilane, dimethyldimethoxysilane, or dimethyldiethoxysilane, a silicon compound containing a polymerizable unsaturated group such as 3-acryloxypropyltrimethoxysilane, 3-methacryloxypropylmethyldimethoxysilane, 3-methacryloxypropylmethyldiethoxysilane, 3-methacryloxypropyltrimethoxysilane, or 3-methacryloxypropyltriethoxysilane, a silicon compound containing an amino group such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl(1,3-dimethylbutylidene)propylamine, N-phenyl-3-aminopropyltrimethoxysilane, or N-(vinylbenzyl)-2-aminoethyl-3-aminopropyltrimethoxysilane hydrochloride, a silicon compound containing an isocyanate group such as 3-ureidopropyltrialkoxysilane, tris-(trimethoxysilylpropyl)isocyanurate, 3-(trimethoxysilyl)propyl isocyanate, or 3-(triethoxysilyl)propyl isocyanate, and a silicon compound containing an epoxy group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, or 2-(3,4-epoxycyclohexyl)ethyltriethoxysilane. One of these may be singly used, or two or more of these may be used in combination. Among these, as the silane coupling agent, 3-(triethoxysilyl)propyl isocyanate and 2-(3,4-epoxycyclohexyl)ethyltrimethoxysilane are preferable.

As the silane coupling agent, a commercially available product such as "I0556", trade name (3-(triethoxysilyl) propyl isocyanate, manufactured by Tokyo Chemical Industry Co., Ltd.) or "E00327", trade name (2-(3,4-epoxycylohexyl)ethyltrimethoxysilane, manufactured by Tokyo Chemical Industry Co., Ltd.) may be used.

It is noted that the electrically conductive rubber forming the electrode member 3 may further contain other components in addition to the components mentioned above in a range where the effects of the present disclosure are not impaired. As other components, compounding agents commonly used in the rubber industry, for example, a dispersant, a reinforcing agent, a filler such as dry silica, an anti-aging agent, a processing aid, and a plasticizer can be appropriately compounded.

As the dispersant, a modified silicone may be contained. As the modified silicone, one obtained by introducing a side chain for causing modification into a main chain containing a siloxane bond (—Si—O—; also referred to as a silicone chain) can be preferably used, and examples include silicones obtained by polyether modification, polyether-alkyl co-modification, polyglycerin modification, polyglycerin-alkyl co-modification or the like. The side chain causing modification preferably contains an ether bond (—C—O—C—). As a polyether-modified silicone, one obtained by introducing a side chain of a polyether chain into a main chain of a silicone chain can be used. As a polyether-alkyl co-modified silicone, one obtained by introducing a side chain of a polyether chain and a side chain of an alkyl chain into a main chain of a silicone chain can be used.

As a polyglycerin-modified silicone, one obtained by introducing a side chain of a polyglycerin chain into a main chain of a silicone chain can be used. As a polyglycerin-alkyl co-modified silicone, one obtained by introducing a side chain of a polyglycerin chain and a side chain of an alkyl chain into a main chain of a silicone chain can be used. Among these, a polyether-modified silicone and a polyglycerin-modified silicone are particularly preferable.

As the dispersant, a commercially available product such as "KF-6106", trade name (a polyglycerin-modified silicone surfactant, manufactured by Shin-Etsu Chemical Co., Ltd.) or "KF-6015", trade name (a polyether-modified silicone surfactant, manufactured by Shin-Etsu Chemical Co., Ltd.) may be used.

As mentioned above, the electrode member 3 is a member formed by curing the silicone rubber, and hence has flexibility and elasticity, has satisfactory adhesion onto the body of a subject, has a soft skin feel, is unlikely to cause discomfort even when allowed to adhere for a long period, and thus can maintain a stable contact with the body of the subject.

The electrode member 3 is molded by curing the silicone rubber, used as a binder, containing the metal particles compounded therein; and on the surface of the electrode member 3 molded, the metal particles responsible for electrical contact with a subject are present. The contact impedance between the skin of a subject and the electrode member 3 is defined not by an apparent contact area but is defined by an effective contact area between the metal particles responsible for the electrical contact and the skin. In a conventional electrode member, the contact impedance is increased due to increase of the number of times of usage, and hence noise mixed in a detected biosignal is increased or a biosignal itself cannot be obtained in some cases. This is because metal particles present at a tip end of the electrode member fall off during the usage, and hence an effective contact area between silver particles responsible for the electrical contact and the skin is reduced.

In contrast, in the present embodiment, the metal particles are surface treated with the silane coupling agent to introduce the crosslinkable functional group onto the surface of the metal particles, and thus, the adhesion between the metal particles used as a filler and the silicone rubber used as the binder is improved by the cross-linking via the crosslinkable functional group, and therefore, even when the tip end part 31 of the electrode member 3 contacts with the skin of a subject, the metal particles can be prevented from falling off from the tip end part 31. Accordingly, even if the number of times of usage of the electrode member 3 increases, the increase of the contact impedance can be prevented, so as to avoid a situation where noise mixed in a biosignal to be detected is increased as well as a situation where a biosignal itself cannot be obtained.

Subsequently, a method for producing the bioelectrode 1 having the configuration mentioned above will be described. The method for producing the bioelectrode 1 includes a metal particle surface treatment step, an electrode member molding step, and an electrode shape forming step. The metal particle surface treatment step is a step of conducting surface treatment with a surface treatment agent to provide metal particles containing a crosslinkable functional group introduced onto the surface thereof. The electrode member molding step is a step of shaping the electrode member 3 by stirring the electrically conductive rubber containing the silicone rubber and the metal particles and molding this electrically conductive rubber into a shape projecting from the support member 2. The electrode shape forming step is a step of forming the tip end part 31 of the electrode member 3 into a pointed shape. Hereinafter, the method for producing the bioelectrode 1 will be specifically described.

Figure 8:
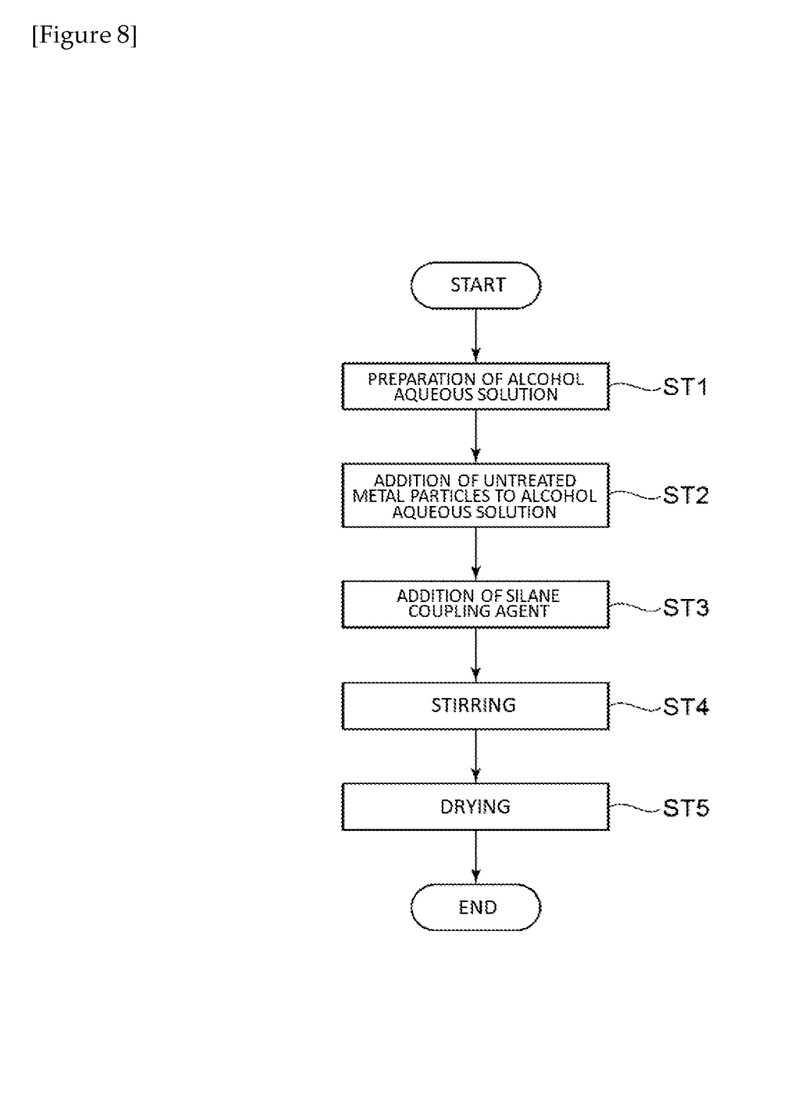
FIG. 8 is a flowchart illustrating the outline of a method for producing treated metal particles used in the bioelectrode according to the embodiment of the present disclosure.

FIG. 8 is a flowchart illustrating the outline of the surface treatment of the metal particles according to the embodiment of the disclosure. As illustrated in FIG. 8, the surface treatment of the metal particles of the present embodiment includes a first step ST1 of preparing an alcohol aqueous solution, a second step ST2 of adding metal particles to the prepared alcohol aqueous solution, a third step ST3 of adding a surface treatment agent to the alcohol aqueous solution to which the metal particles have been added to obtain a mixed solution, a fourth step ST4 of stirring the mixed solution, and a fifth step ST5 of drying the mixed solution after stirring.

In the first step ST1, an alcohol compound and water are mixed to prepare an alcohol aqueous solution. Examples of the alcohol compound include methanol, ethanol, propanol, isopropanol, and butanol. Among these, ethanol is preferable as the alcohol compound. Examples of the water include ion-exchanged water, distilled water and pure water. A mixing ratio between the water and the alcohol compound (water:alcohol compound) is preferably 0.1 to 99.9 to 50:50.

In the second step ST2, metal particles are added to the alcohol aqueous solution prepared in the first step ST1 to obtain a mixture in the form of a slurry. An amount of the metal particles added is, based on a total mass of the mixture in the form of a slurry, for example, preferably 10% by mass or more and 70% by mass or less, and more preferably 20% by mass or more and 40% by mass or less.

In the third step ST3, a silane coupling agent is added to the mixture in the form of a slurry prepared in the second step ST2. An amount of the silane coupling agent added is, based on the mass of the metal particles added, for example, preferably 0.1% by mass or more and 10% by mass or less, and more preferably 0.5% by mass or more and 5% by mass or less.

In the fourth step ST4, the mixture in which the silane coupling agent has been added in the third step ST3 is stirred to cause a reaction between the silane coupling agent and the metal particles, to provide treated metal particles containing a crosslinkable functional group introduced onto the surface of the metal particles. A stirring temperature is, for example, 10° C. or more and 40° C. or less. A stirring time is, for example, 1 minute or more and 1 hour or less.

In the fifth step ST5, the treated metal particles obtained in the fourth step ST4 are dried to remove the alcohol aqueous solution. In the fifth step ST5, the treated metal particles from which the alcohol aqueous solution has been removed can be obtained by drying the metal particles, for example, under atmospheric (normal) pressure, at 60° C. or more and 100° C. or less for 10 minutes or more and 50 minutes or less, and then at 130° C. or more and 170° C. or less for 70 minutes or more and 110 minutes or less. It is noted that the drying performed in the fifth step ST5 need not be always performed in two stages but may be performed in a single stage. Besides, the pressure condition, the drying temperature, and the drying time employed in the drying can be appropriately changed.

The bioelectrode 1, as mentioned above, is integrally molded from the same electrically conductive rubber, and the electrically conductive rubber is cured in a mold, and the support member 2 and the electrode member 3 are integrally molded. In other words, the support member 2 and the electrode member 3 are integrally molded in the electrode member molding step. However, in an as-molded state in the electrode member molding step, the exposed face 32 has not been formed in the electrode member 3, but the tip end portion 31 of the electrode member 3 is molded in the form of the intermediate product 40 having a hemispherical or substantially hemispherical shape (see FIG. 7).

Figure 7:
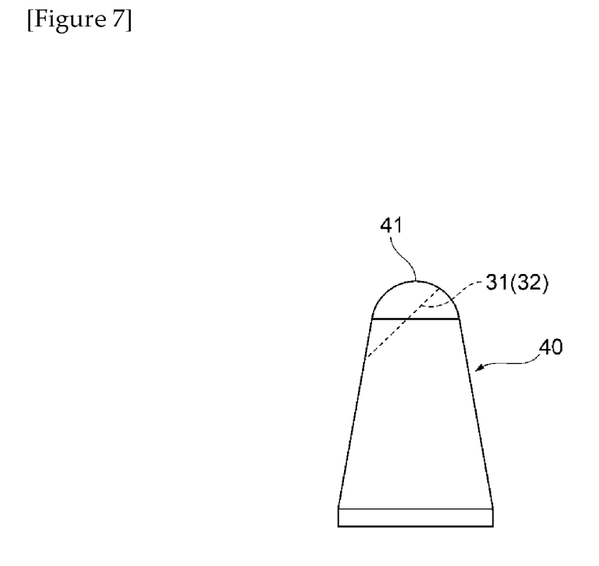
FIG. 7 is a front view of an electrode member in an intermediate product molded in an electrode member molding step of a method for producing a bioelectrode according to the embodiment of present disclosure.

Next, in the electrode shape forming step, the tip end portion 41 of the intermediate product 40 of the electrode member 3 is removed, and thus, the inclined face 32 is formed on the tip end part 31 (see FIG. 7). In this manner, the electrode member 3 is formed, and the bioelectrode 1 is completed. The removal of the tip end portion 41 of the intermediate product 40 can be performed by various methods, and is conducted by cutting or polishing, for example. An example of cutting is cutting with a cutting tool such as a cutter, and an example of polishing is surface polishing. In the electrode member 3 of the thus completed bioelectrode 1, the tip end part 31 has the inclined face 32 and is in a pointed shape. Therefore, even when the tip end part 31 of the electrode member 3 is disposed on the head of a subject, the tip end part 31 pushes hair of the subject aside to contact the scalp, and thus, the contact impedance between the electrode member 3 and the scalp can be reduced. Besides, since the adhesion between the crosslinkable functional group of the treated metal particles and the silicone rubber is improved via the cross-linking here, the treated metal particles do not fall off from the surface of the electrode member 3 even when the tip end part 31 of the electrode member 3 pushes the hair aside.

As mentioned above, in the bioelectrode 1, the electrode member 3 are formed of an electrically conductive rubber, therefore the bioelectrode 1 has satisfactory elasticity so as not to cause discomfort to a subject, and additionally can uniformly adhere to a target site of the subject. For this reason, a reinforcing member, such as a core material, for imparting elasticity to the electrode member 3 is not required. It is also possible to form the electrode member 3 only from the electrically conductive rubber, therefore the structure of the electrode member 3 is not complicated, and thus the production can be facilitated. The electrode member 3 has the exposed face 32 formed by removal of a molded surface layer 42, therefore the bioelectrode 1 does not require use of an electrically conductive gel, an electrolyte solution, or the like, is easily used, and additionally causes no discomfort to a subject. Furthermore, since the crosslinking is formed between the silicone rubber and the metal particles contained in the electrically conductive rubber via the crosslinkable functional group at the time of the molding, the adhesion between the metal particles and the silicone rubber is improved and hence the metal particles are held by the silicone rubber in the electrode member. Therefore, even when the same bioelectrode is used for brainwave measurement a plurality of times, for example, the metal particles can be prevented from falling off from the surface of the electrode member every time of the usage, resulting in preventing the increase of the contact impedance due to the increase of the number of times of usage. In addition, since the increase of the contact impedance can be prevented even when the number of times of usage increases, increase of noise in a biosignal to be detected is prevented so as to realize a highly durable bioelectrode free from a situation where a biosignal itself cannot be obtained. Accordingly, the bioelectrode can inhibit the metal particles from falling off from the electrode member otherwise caused by a contact with a subject to be measured, and can prevent the increase of the contact impedance due to the increase of the number of times of usage.

In this manner, the bioelectrode 1 according to the embodiment of the present disclosure has a structure not complicated, has a satisfactory elasticity, and can prevent the increase of the contact impedance due to the increase of the number of times of usage.

Although the embodiment of the present disclosure has been described hereinabove, the present disclosure is not limited to the embodiment of the present disclosure described above and includes any aspects included in the concept and claims of the present disclosure. The configurations may be appropriately and selectively combined to solve or provide at least part of the above-described problems or effects. For example, the shape, material, arrangement, size, and the like of each component in the embodiment described above may be appropriately changed in accordance with specific use aspects of the present disclosure.

For example, the shape of the support member 2 is not limited to the shape mentioned above but may be a different shape. Similarly, the shape of the electrode member 3 is not limited to the shape mentioned above but may be a different shape.

The support member 2 and the electrode member 3 may be separate bodies from each other, and the electrode member 3, after formed by the surface treatment step and the electrode member molding step mentioned above, may be attached and fixed to the support member 2 formed as a separate body to thereby form the bioelectrode 1. Fixing of the electrode member 3 to the support member 2 may be achieved with an electrically conductive adhesive or may be achieved with engagement such as fitting. For example, a recessed part or protruding part is formed at the bottom of the electrode member 3, the corresponding protruding part or recessed part is formed in the support member 2, and the recessed part and the protruding part are engaged with each other to thereby enable the electrode member 3 to be fixed to the support member 2. The electrode member 3 may be detachably fixed to the support member 2.

When the support member 2 and the electrode member 3 are separate bodies, both the support member 2 and the electrode member 3 may be formed of the same material using the electrically conductive rubber mentioned above or may be formed of different materials. When the support member 2 is formed of a material different from that of the electrode member 3, the support member 2 can be formed of a material having electrical conductivity different from the electrically conductive rubber. As the material having electrical conductivity for the support member 2, a material having electrical conductivity suitable for supporting the electrode member 3 is preferable, and for example, it is possible to use a metal, such as stainless steel, copper, or aluminum, having a strength enough to stably support the electrode member 3. The material of the support member 2 is not limited thereto, and materials having electrical conductivity can be used.

EXAMPLES

Hereinafter, the present disclosure will be more specifically described based on examples performed for further clarifying the effects of the present disclosure. It is noted that the present disclosure is not limited to examples and comparative example mentioned below.

The present inventors produced the bioelectrodes 1 according to the embodiment of the present disclosure (Examples 1 and 2) and conducted a contact impedance evaluation test on the bioelectrodes 1. The present inventors also produced a bioelectrode as a comparative example (Comparative Example 1) and conducted the same contact impedance evaluation test on Comparative Example 1. It is noted that each of the electrodes of Examples 1 and 2 and Comparative Example 1 had the shape illustrated in FIG. 4.

Silane Coupling Treatment of Silver Particles

In this example, silver particles were surface-treated by a wet method using a silane coupling agent to prepare four types of surface-treated silver particles (hereinafter, silver particles prior to the treatment with the silane coupling agent are referred to also as "untreated silver particles", silver particles after the treatment with the silane coupling agent are referred to also as "treated silver particles", and the "untreated silver particles" and the "treated silver particles" are generically referred to also as "silver particles"). The silane coupling agents used for preparing the four types of treated silver particles A to D and functional groups introduced onto the treated silver particles A to D are shown in Table 1 below. Hereinafter, a method for preparing the treated silver particles A to D will be described.

Preparation of Treated Silver Particles A

First, 10 g of water and 90 g of ethanol were mixed to prepare 100 g of an ethanol aqueous solution containing water and ethanol in a mass ratio of 1:9 (step ST1). Thereafter, under stirring 100 g of the thus prepared ethanol aqueous solution at room temperature (20° C. to 30° C.), 30 g of untreated silver particles A ("G-35", trade name, manufactured by DOWA Electronics Materials Co., Ltd.) was added thereto to obtain a mixture in the form of a slurry (step ST2).

Thereafter, 0.3 g of a silane coupling agent A (3-(triethoxysilyl)propyl isocyanate: "I0556", trade name, manufactured by Tokyo Chemical Industry Co., Ltd.) in an amount of 1% by mass based on the untreated silver particles A was added in a dropwise manner to the slurry of the untreated silver particles A at room temperature (20° C. to 30° C.), followed by stirring for 10 minutes (steps ST3 and ST4). Thereafter, under atmospheric pressure, the resultant was dried at 80° C. for 30 minutes and then at 150° C. for 90 minutes, to prepare 30 g of the treated silver particles A containing an isocyanate group introduced by the silane coupling treatment (step ST5). Compounding of the treated silver particles A is shown in Table 1 below.

Preparation of Treated Silver Particles B 30 g of the treated silver particles B containing an isocyanate group through the silane coupling treatment was prepared in the same manner as the treated silver particles A except that 30 g of untreated silver particles B ("FA-2-3", trade name, manufactured by DOWA Electronics Materials Co., Ltd.) was used instead of 30 g of the untreated silver particles A ("G-35", trade name, manufactured by DOWA Electronics Materials Co., Ltd.). The compounding of the treated silver particles B is shown in Table 1 below.

Preparation of Treated Silver Particles C 30 g of the treated silver particles C containing an epoxy group through the silane coupling treatment was prepared in the same manner as the treated silver particles A except that 0.3 g of a silane coupling agent B (2-(3,4-epoxycyclohexyl)ethyltrimethoxysilane: "E00327", trade name, manufactured by Tokyo Chemical Industry Co., Ltd.) was used instead of 0.3 g of the silane coupling agent A (3-(triethoxysilyl)propyl isocyanate: "I0556", trade name, manufactured by Tokyo Chemical Industry Co., Ltd.). Compounding of the treated silver particles C is shown in Table 1 below.

Preparation of Treated Silver Particles D 30 g of the treated silver particles D containing an epoxy group through the silane coupling treatment was prepared in the same manner as the treated silver particles C except that 30 g of the untreated silver particles B ("FA-2-3", trade name, manufactured by DOWA Electronics Materials Co., Ltd.) was used instead of 30 g of the untreated silver particles A ("G-35", trade name, manufactured by DOWA Electronics Materials Co., Ltd.). Compounding of the treated silver particles D is shown in Table 1 below.

TABLE 1

| Silver Particles | Silane Coupling Agent | Introduced Functional Group |
| --- | --- | --- |
| Treated Silver Particles A | Silane Coupling Agent A | Isocyanate Group |
| Treated Silver Particles B | Silane Coupling Agent A | Isocyanate Group |
| Treated Silver Particles C | Silane Coupling Agent B | Epoxy Group |
| Treated Silver Particles D | Silane Coupling Agent B | Epoxy Group |
| Untreated Silver Particles A | — | — |
| Untreated Silver Particles B | — | — |

The respective components shown in Table 1 are as follows:
Untreated silver particles A: "G-35", trade name (manufactured by DOWA Electronics Materials Co., Ltd.)
Untreated silver particles B: "FA-2-3", trade name (manufactured by DOWA Electronics Materials Co., Ltd.)
Silane coupling agent A: 3-(triethoxysilyl)propyl isocyanate ("I0556", trade name, manufactured by Tokyo Chemical Industry Co., Ltd.)
Silane coupling agent B: 2-(3,4-epoxycyclohexyl)ethyltrimethoxysilane ("E00327", trade name, manufactured by Tokyo Chemical Industry Co., Ltd.)

Example 1

Production of Bioelectrode

A material was produced by centrifugal stirring of 100 parts by mass of a silicone rubber ("KE-106", trade name, manufactured by Shin-Etsu Chemical Co., Ltd.) used as a binder, 10 parts by mass of a curing agent ("CAT-RG", trade name, manufactured by Shin-Etsu Chemical Co., Ltd.), 165 parts by mass of the treated silver particles A and 165 parts by mass of the treated silver particles B used as a filler, 10 parts by mass of a dispersant A ("KF-6106", trade name, manufactured by Shin-Etsu Chemical Co., Ltd.), and 10 parts by mass of a dispersant B ("KF-6015", trade name, manufactured by Shin-Etsu Chemical Co., Ltd.). Thereafter, after the thus obtained material was cast molded, primary cross-linking was performed under conditions of 150° C. and 3 minutes, and secondary cross-linking was then performed under conditions of 150° C. and 30 minutes. Subsequently, a saline treatment for immersing the resultant in a 10% by mass sodium chloride aqueous solution (saline) at 121° C. at 0.1 MPaG for 1 hour in an autoclave was performed to produce an intermediate product. Thereafter, a tip end part 31 of an electrode member 3 of the intermediate product was cut into a shape illustrated in FIG. 4 to mold the electrode member 3, to produce a bioelectrode of Example 1. Compounding of the bioelectrode is shown in Table 2 below.

Example 2

A bioelectrode was produced in the same manner as in Example 1 except that 165 parts by mass of the treated silver particles C was used instead of 165 parts by mass of the treated silver particles A, and that 165 parts by mass of the treated silver particles D was used instead of 165 parts by mass of the treated silver particles B. Compounding of the bioelectrode is shown in Table 2 below.

Comparative Example 1

A bioelectrode was produced in the same manner as in Example 1 except that 165 parts by mass of the untreated silver particles A not subjected to the silane coupling treatment was used instead of 165 parts by mass of the treated silver particles A, and that 165 parts by mass of the untreated silver particles B not subjected to the silane coupling treatment was used instead of 165 parts by mass of the treated silver particles B. Compounding of the bioelectrode is shown in Table 2 below.

TABLE 2

| Component | Example 1 | Example 2 | Comparative Example 1 |
| --- | --- | --- | --- |
| Silicone Rubber | 100 | 100 | 100 |
| Curing Agent | 10 | 10 | 10 |
| Treated Silver Particles A | 165 | | |
| Treated Silver Particles B | 165 | | |
| Treated Silver Particles C | | 165 | |
| Treated Silver Particles D | | 165 | |
| Untreated Silver Particles A | | | 165 |
| Untreated Silver Particles B | | | 165 |
| Dispersant A | 10 | 10 | 10 |
| Dispersant B | 10 | 10 | 10 |

The respective components shown in Table 2 are as follows:
Silicone rubber: polydimethylsiloxane ("KE-106", trade name, manufactured by Shin-Etsu Chemical Co., Ltd.)

Curing agent: "CAT-RG", trade name (manufactured by Shin-Etsu Chemical Co., Ltd.)

Dispersant A: polyglycerin-modified silicone surfactant ("KF-6106", trade name, manufactured by Shin-Etsu Chemical Co., Ltd.)

Dispersant B: polyether-modified silicone surfactant ("KF-6015", trade name, manufactured by Shin-Etsu Chemical Co., Ltd.)

Evaluation Method

Figure 9:
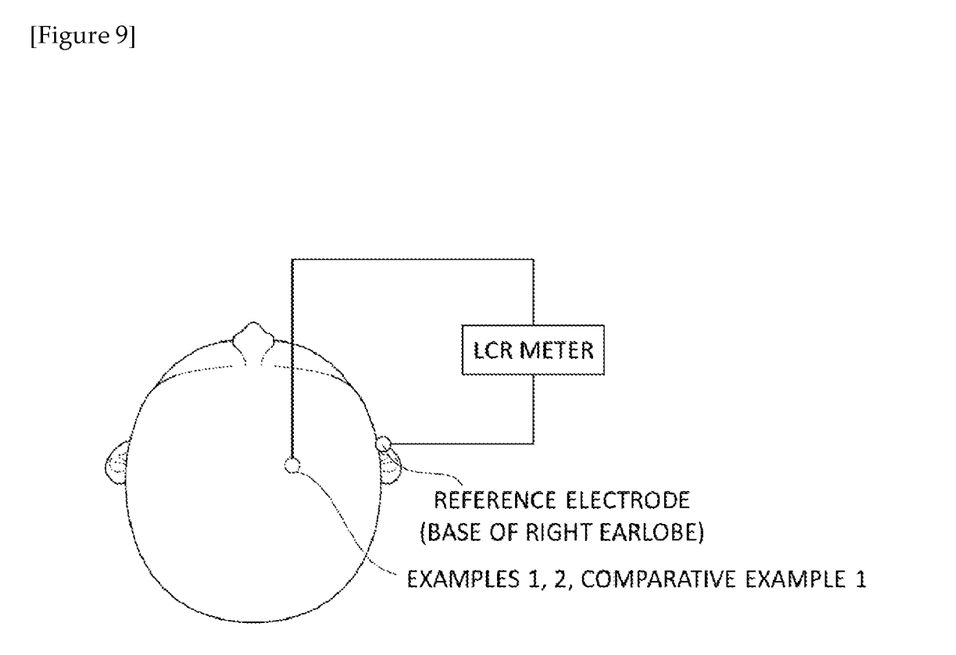
FIG. 9 is a view for illustrating a contact impedance evaluation test of the bioelectrode according to the embodiment of present disclosure.

FIG. 9 is a view for illustrating a contact impedance evaluation test of the examples and the comparative example. As illustrated in FIG. 9, the contact impedance evaluation test was conducted by measuring the contact impedance of each of Examples 1 and 2 and Comparative Example 1 by using an LCR meter. A reference electrode of the LCR meter (model number "ZM2371", manufactured by NF Corporation) was fixed to the base of the right earlobe of a subject with an electroencephalographic paste (model number "Ten20", manufactured by WEAVER and Company) and connected in a state where the contact impedance was sufficiently reduced, and each of Examples 1 and 2 and Comparative Example 1 used as an induction electrode was pressed against the right parietal of the subject at a pressing load of 2 N to measure the contact impedance of each of Examples 1 and 2 and Comparative Example 1. As a measurement value of the contact impedance, a value obtained one minute after the contact of each of Examples 1 and 2 and Comparative Example 1 with the scalp was employed. In order to verify the durability of each of the bioelectrodes, the same sample was used for performing the measurement ten times, and change in the contact impedance caused due to the increase of the number of times of the measurement was recorded (number n of test times=10).

Figure 10:
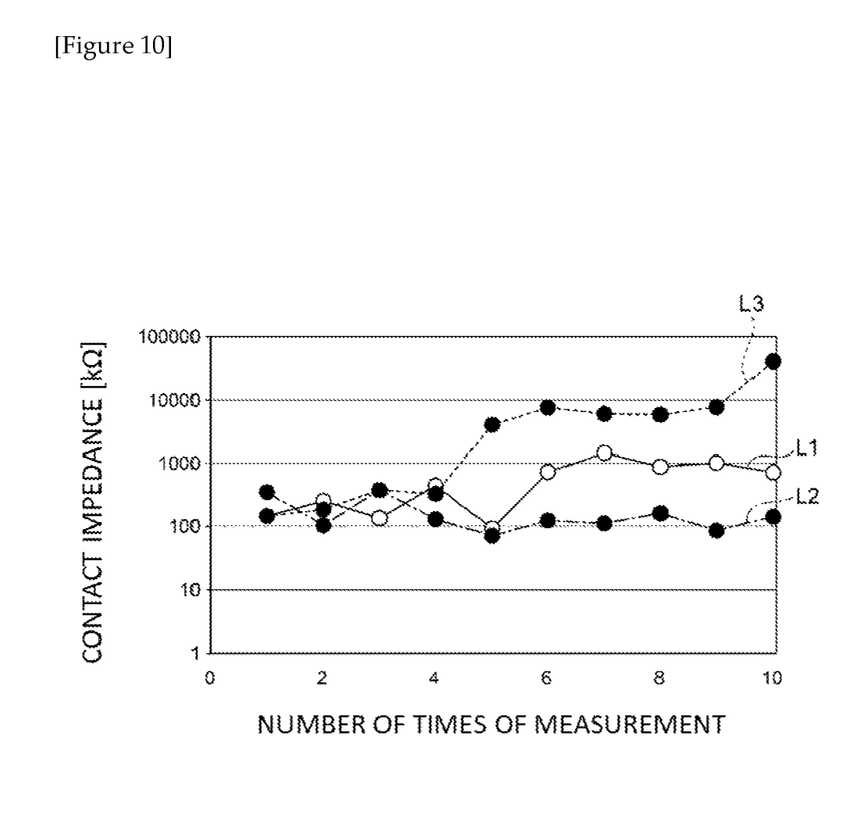
FIG. 10 is a view illustrating results of the contact impedance evaluation test performed for examples and a comparative example of the present disclosure.

FIG. 10 is a view illustrating results of the contact impedance measurement test of the examples and the comparative example of the present disclosure. As illustrated in FIG. 10, in the bioelectrode of Example 1, the contact impedance was slightly increased as the number of times of the measurement was increased, but the value of the contact impedance was not largely increased due to the increase of the number of times of the measurement, and an average value of the contact impedance after performing the measurement ten times was as low as 576 [k$\Omega$] (see a solid line L1). In Example 2, the contact impedance was not increased even when the number of times of the measurement was increased, a value of the contact impedance was retained at 500 k$\Omega$ or less during the first to tenth measurement, and an average value of the contact impedance after performing the measurement ten times was a very low value of 165 [k$\Omega$] (see a dashed and dotted line L2). These results were obtained probably because the adhesion between the silicone rubber and the treated silver particles was improved by the cross-linking between the silicone rubber used as the binder and the crosslinkable functional group of the treated silver particles, used as the filler, obtained after the silane coupling treatment, so as to inhibit the treated silver particles from falling off from the binder. In contrast, in Comparative Example 1, the contact impedance had a value of several hundred k$\Omega$ in the first to fourth measurement, but was rapidly increased after the fifth or more measurement, and an average value of the contact impedance after performing the measurement ten times was 7180 [k$\Omega$] (see a broken line L3). This result was obtained probably because the untreated silver particles not subjected to the silane coupling treatment was used, and hence the adhesion between the silicone rubber and the untreated silver particles was not improved by the cross-linking between the silicone rubber used as the binder and the untreated silver particles, and therefore the untreated silver particles fell off from the binder.

In this manner, it is understood, according to Examples 1 and 2 and Comparative Example 1, that when silver particles having been subjected to a silane coupling treatment were used, it is possible to prevent the increase of the contact impedance caused because of falling of the silver particles due to the increase of the number of times of usage, leading to largely improved durability of a bioelectrode.

INDUSTRIAL APPLICABILITY

As described so far, the present disclosure has effects of realizing a bioelectrode in which increase of contact impedance because of falling of silver particles due to increase of the number of times of usage can be prevented and which is excellent in durability, and a method for producing the bioelectrode, and is suitably applicable particularly in the fields of wearable information devices, brain-machine interface, medical care, elderly care, welfare, medical measuring devices, game machines, autonomous driving, electronics wiring and the like.

The invention claimed is:

1. A bioelectrode comprising:
a support member, which is an electrically conductive member; and
at least one electrode member, which is a member projecting from the support member,
wherein at least the electrode member is molded from an electrically conductive rubber, the electrically conductive rubber containing a silicone rubber and metal particles containing a crosslinkable functional group that is chemically bonded to the metal particles by a silane coupling agent,
wherein the crosslinkable functional group is at least one group selected from the group consisting of hydrolyzable silyl group, a (meth)acryloyl group, a ureide group, an isocyanurate group, and isocyanate group, and an epoxy group, and
wherein, in the electrically conductive rubber, a content of the metal particles containing the crosslinkable functional group is within a range of 50 to 500 parts by weight with respect to 100 parts by weight of the silicone rubber.

2. The bioelectrode according to claim 1, wherein the metal particles are silver particles.

3. The bioelectrode according to claim 1, wherein the silicone rubber is a room temperature-curable liquid silicone rubber.

4. The bioelectrode according to claim 1, wherein the electrode member has a tip end part in a pointed shape.

5. The bioelectrode according to claim 4, wherein the electrode member has an inclined face, which is a face formed by removal in the tip end part inclinedly to an extending direction.

6. The bioelectrode according to claim 1, wherein the crosslinkable functional group on the surface of the metal particle is configured to bond the silicone rubber to the metal particle by cross-linking.

* * * * *